United States Patent
Das et al.

(10) Patent No.: US 7,739,324 B1
(45) Date of Patent: Jun. 15, 2010

(54) TIMING DRIVEN SYNTHESIS OF SUM-OF-PRODUCT FUNCTIONAL BLOCKS

(75) Inventors: Sabyasachi Das, Santa Clara, CA (US); Jean-Charles Giomi, Menlo Park, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 1057 days.

(21) Appl. No.: 11/387,470

(22) Filed: Mar. 22, 2006

(51) Int. Cl.
*G06F 7/00* (2006.01)

(52) U.S. Cl. .................................... 708/603
(58) Field of Classification Search ............... 708/603
See application file for complete search history.

(56) References Cited

U.S. PATENT DOCUMENTS

| | | | |
|---|---|---|---|
| 4,747,157 A | 5/1988 | Kurakake et al. | |
| 4,916,627 A * | 4/1990 | Hathaway | 716/6 |
| 5,151,867 A | 9/1992 | Hooper et al. | |
| 5,189,636 A | 2/1993 | Patti et al. | |
| 5,231,601 A | 7/1993 | Stearns | |
| 5,241,493 A | 8/1993 | Chu et al. | |
| 5,270,955 A | 12/1993 | Bosshart et al. | |
| 5,424,969 A | 6/1995 | Yamada et al. | |
| 5,457,805 A | 10/1995 | Nakamura | |
| 5,475,605 A * | 12/1995 | Lin | 716/6 |
| 5,508,950 A | 4/1996 | Bosshart et al. | |
| 5,751,618 A | 5/1998 | Abiko et al. | |
| 5,751,622 A | 5/1998 | Purcell | |
| 5,764,557 A | 6/1998 | Hara et al. | |
| 5,847,981 A * | 12/1998 | Kelley et al. | 708/603 |
| 5,867,413 A | 2/1999 | Yeh | |
| 5,880,984 A | 3/1999 | Burchfiel et al. | |
| 5,880,985 A | 3/1999 | Makineni et al. | |
| 5,883,825 A * | 3/1999 | Kolagotla | 708/626 |
| 5,956,257 A | 9/1999 | Ginetti et al. | |
| 6,004,022 A | 12/1999 | Tsubakihara | |
| 6,018,758 A | 1/2000 | Griesbach et al. | |

(Continued)

FOREIGN PATENT DOCUMENTS

DE  EP0347029  12/1989

OTHER PUBLICATIONS

Mark D. Birnbaum, Essential Electronic Design Automation (EDA); 2004 Pearson Education, Inc.; Prentice Hall Professional Technical Reference, Upper Saddle River, New Jersey 07458, pp. 115-116.

(Continued)

*Primary Examiner*—Tan V Mai
(74) *Attorney, Agent, or Firm*—Alford Law Group, Inc.; William E. Alford

(57) ABSTRACT

In one embodiment of the invention, an integrated circuit (IC) design tool is provided that has a sum-of-products (SOP) synthesizer. The SOP synthesizer receives expected arrival times of signals including partial product terms of each bit-vector of a SOP functional block, a comparison gate delay, and a register-transfer-level (RTL) netlist in order to synthesize a gate-level netlist of the SOP functional block. The SOP synthesizer includes software modules to synthesize a partial products generator, a partial product reduction tree, and an adder. The synthesis of the partial product reduction tree is responsive to a comparison gate delay and the expected arrival times of the partial product terms in each bit vector.

22 Claims, 11 Drawing Sheets

U.S. PATENT DOCUMENTS

| | | | |
|---|---|---|---|
| 6,286,024 | B1 | 9/2001 | Yano et al. |
| 6,295,628 | B1 | 9/2001 | Nakamura et al. |
| 6,385,635 | B1 | 5/2002 | Ishii |
| 6,546,539 | B1 * | 4/2003 | Lu et al. ............... 716/12 |
| 6,704,762 | B1 | 3/2004 | Inoue |
| 6,769,007 | B2 | 7/2004 | Sutherland et al. |
| 6,781,412 | B2 | 8/2004 | Yoshida et al. |
| 6,842,845 | B2 | 1/2005 | Ganapathy et al. |
| 6,895,423 | B2 | 5/2005 | Kawata |
| 7,111,273 | B1 * | 9/2006 | Ganesan et al. ......... 716/17 |
| 7,219,048 | B1 * | 5/2007 | Xu ...................... 703/19 |
| 2003/0061577 | A1 * | 3/2003 | Saluja et al. ............. 716/2 |
| 2006/0059222 | A1 | 3/2006 | Dewan |

OTHER PUBLICATIONS

Melvin A. Breuer (Edited by), Design Automation of Digital Systems, vol. One, Chapter Two, Logic Synthesis; pp. 21-101, 1972 by Prentice Hall, Inc., Englewood Cliffs, New Jersey.

M. Morris Mano, Digital Logic and Computer Design, 1979 by Prentice-Hall, Inc., pp. 116-123, Chapter 4, Combinational Logic; Englewood Cliffs, N.J. 07632.

J.Pihl, E.J Aas, "A Multiplier and Squarer Generator for High Performance DSP Applications" in Proceeding of IEEE 39th Midwest Symposium on Circuits and Systems, pp. 109-112, 1997.

J.T. Yoo, K.F. Smith, G. Gopalakrishnan, "A Fast Parallel Squarer Based on Divide-and-Conquer" in IEEE Journal on Solid State Circuits, vol. 32, No. 1, pp. 909-912, Jun. 1997.

R.K. Kolagotla, W.R. Griesbach, H.R. Srinivas, "VLSI Implementation of 350MHz 0.35um, 8 Bit Merged Squarer", in IEEE Electronics Letters, vol. 34, No. 1, pp. 47-48, Jan 1998.

A.G.M. Strollo, E. Napoli, D. De Caro, "A New Design of Squarer Circuits Using Booth Encoding and Folding Techniques" in Proceedings of 8th IEEE International Conference on Electronics, Circuits and Systems, Malta, pp. 193-196, Sep. 2-5, 2001.

A.G.M. Strollo, E. Napoli, D. De Caro, "Booth Folding Encoding for High Performance Squarer Circuits" in Transactions on Circuits and Systems II: Analog and Digital Signal Processing, vol. 50, No. 5, pp. 250-254, May 2003.

Y. Jeang, L.B. Chen, J.H. Tu, I.J. Huang "An Efficient and Low Power Systolic Squarer" in Proceedings of IEEE International Symposium on VLSI Design Automation and Test, pp. 37-40, Apr. 27-29, 2005.

C.S. Wallace, "A Suggestion for a Fast Multiplier" in IEEE Transaction on Electronic Computers, pp. 14-17, 1964.

L. Dadda, "Some Schemes for Parallel Multiplies" in Alta Frequenza, vol. 34, pp. 349-356, 1965.

K.C. Bickerstaff, E.E. Swartzlander, M.J. Schulte, "Analysis of Column Compression Multipliers", in Proceedings of 15th IEEE Symposium on Computer Arithmetic, pp. 33-39, 2001.

R.P. Brent, H.T. Kung, "A Regular Layout for Parallel Adders", in IEEE Transactions on Computers, pp. 260-264, 1982.

P.M. Kogge, H.S. Stone, "A Parallel Algorithm for Efficient Solution of a General Class of Recurrence Equations" in IEEE Transaction on Computers, No. 8, pp. 786-793, Aug. 1973.

P.F. Stelling, V.G. Oklobdzija, "Design Strategies for the Final Adder in a Parallel Multiplier" 1995 Conference record of the 29th Asilomar Conference on Signals,Systems, and Computers, vol. 1 published in Journal of VLSI Proceedings, pp. 591-595, 1996.

M. Morris Mano, Professor of Eng, CA State University, LA, Digital Logic and Computer Design, 1979 Prentice-Hall, Inc., Chapter 4, pp. 123-125.

J.P. Hayes, University of Southern California, Computer Architecture and Organization, 1978 McGram-Hill, Inc., section 3.3, pp. 171-209.

H.Taub, D. Schilling, Professors of EE, The City College of the City of University of New York, Digital Integrated Electronics, 1977, McGraw-Hill, Inc., pp. 356-391.

D.M. Lewis, An Architecture for Addition and Subtraction of Long Word Length Numbers in the Logarithmic Number System, 1990 IEEE, pp. 1325-1336.

V.G. Oklobdzija, "A Method for Speed Optimized Partial Product Reduction and Generation of Fast Parallel Multipliers Using an Algorithmic Approach", IEEE Transactions on Computers, vol. 45, issue 3, pp. 294-306, Mar. 1996.

A.J. Al-Kahlili, A. Hu, "Design of a 32-bit Squarer—Exploiting Addition Redundancy", Proceedings of the 2003 International Symposium on Circuits and Systems, vol. 5, pp. V-325-V328.

G. Jung, G.E. Sobelman, High-Speed Adder Design Using Time Borrowing and Early Carry Propagation, 2000 IEEE, pp. 43-47.

M. S. Alam, Optical Carry-free Addition and Borrow-free Subraction Using Signed-Digit Numbers, 1994, IEEE, pp. 1040-1045.

A. K. Cherri, Optical Carry-free Addition and Borrow-free Subtraction Based on Redundant Signed-Digit Numbers, 1990 IEEE, pp. 1094-1099.

* cited by examiner

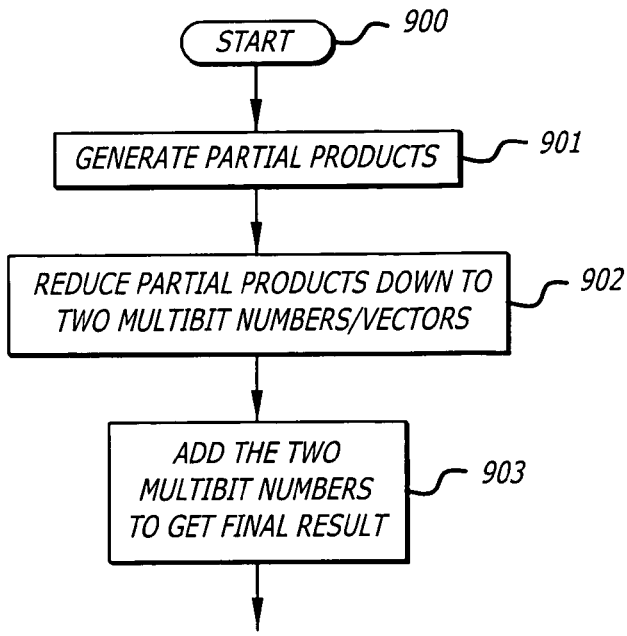
FIG. 9
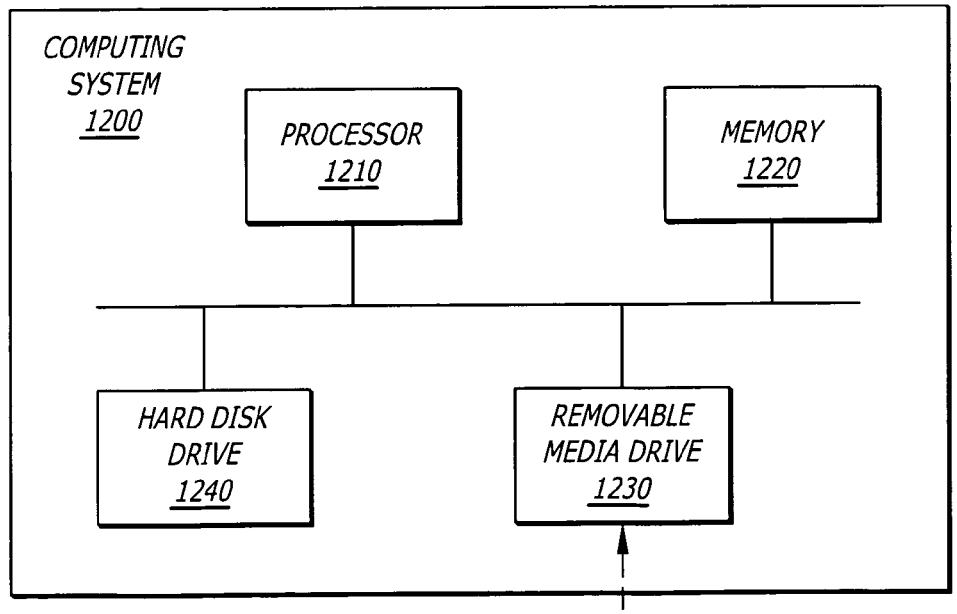
FIG. 12

TIMING DRIVEN SYNTHESIS OF SUM-OF-PRODUCT FUNCTIONAL BLOCKS

FIELD

The embodiments of the invention relate generally to electronic design automation (EDA) for integrated circuits. More particularly, the embodiments of the invention relate to timing driven synthesis of sum-of-product functional blocks within integrated circuits.

BACKGROUND

Functional blocks in semiconductor integrated circuits are often designed with the assumption that all inputs to the block arrive simultaneously together. That is, the design of the functional block assumes that the all input signals to the block are valid, steady state signals at the same time with respect to a clock signal. In many cases, this is an incorrect assumption because the input signals into functional blocks often arrive at different times.

The design of a function block may require three or more input signals be evaluated simultaneous to produce a resultant output. However, the time spent waiting for the input signals to be valid at the input to the functional block is often not considered and leads to an unexpected increase in the delay of signals through the functional block. It is desirable to consider the input signal timing during the synthesis of the logic of functional blocks in integrated circuits.

BRIEF SUMMARY

The embodiments of the invention are summarized by the claims that follow below.

BRIEF DESCRIPTIONS OF THE DRAWINGS

FIG. 9 is a flow chart of a method performed by embodiments of the invention.

FIG. 12 illustrates an exemplary embodiment of a computing system usable with embodiments of the invention.

DETAILED DESCRIPTION

Figure 1:
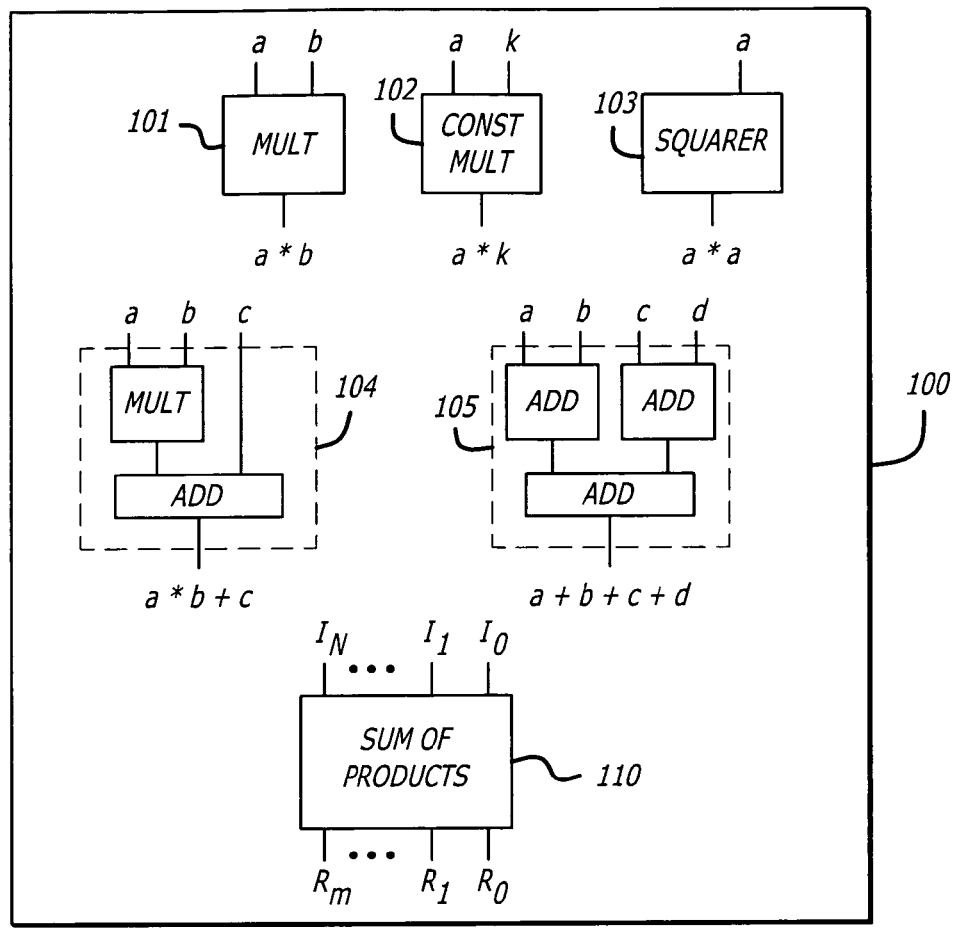
FIG. 1 is a diagram illustrating an exemplary integrated circuit with one or more functional blocks having circuit logic synthesized in accordance with the embodiments of the invention.

In the following detailed description of the embodiments of the invention, numerous specific details are set forth in order to provide a thorough understanding of the embodiments of the invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

The embodiments of the invention include a method, apparatus and system for the synthesis of the circuit logic of functional blocks that generally include a sum of products computation. Logic gates are generally selected for the functional blocks in response to the expected timing of input signals generated by other functional blocks.

A sum of products is a standard form way to express arithmetic functions. The sum of products, in contrast to a product of sums, is an arithmetic expression containing multiplication terms, referred to as product terms or partial product terms, of one or more vectors or variables. The sum in the phrase sum of products denotes the addition operation of the partial product terms in the arithmetic expression. The product terms or partial products terms may also be referred to as partial products when arithmetic or DSP operations are performed on vectors.

A literal is a primed binary vector/variable (e.g., y') or unprimed binary vector/variable (e.g., y) in the Boolean expression. The unprimed binary vector/variable is the normal form of a signal. The primed binary vector/variable is the complement or inverted form of the signal often generated by using a set of inverters or NOT gates.

An example function expressed in sum of products terms is F=y'+xy+x'yz'. This function has three product terms of one, two, and three vectors each, respectively. The sum of these three product terms is an addition operation. The product terms are formed by multiplying the individual vector signals.

When performing arithmetic operations on vectors having multiple bits or multiple samples, many product terms can be generated such that a plurality of adders may be needed to sum them all together to obtain the multiple bits of the resultant output. In order to reduce the number of adders and to speed the generation of the resultant output, it is desirable to reduce the number of partial product terms that are to be added together by one single adder.

A timing-driven algorithm is used to optimally reduce the partial products in any type of sum-of-products (a.k.a. SOP) functional block of an integrated circuit in response to the expected timing of input signals. To reduce the logic used to compute the partial products, two input/two output (2:2) counters are selectively used with three input/two output (3:2)

counters in a partial products reduction tree. The (2:2) counters are binary half adders while the (3:2) counters are binary full adders.

From the expected arrival timing of the signals, two input signals may be identified that are expected to arrive at substantially the same time, in which case a (2:2) counter may be used to reduce the two signals to one signal at that bit (e.g., sum bit) and one signal to the next higher bit (e.g., a carry signal). By using a (2:2) counter in this case for these two input signals, there is no need to wait for a third signal that would otherwise be required if a (3:2) counter were used. Selectively using (2:2) counters in response to the expected arrival timing of input signals results in a faster reduction of partial products, that can significantly improve the overall delay through the computation of sum-of-products in a functional block.

In any. Sum-of-Product (SOP) module for a functional block, a significant portion of signal delay is consumed by the partial product reduction tree. In some cases, up to 75% of the total delay of the SOP is consumed by the partial product reduction tree. Additionally, some IC designs require that the SOP module be pipelined by including clocked registers in the data paths. Thus, any improvement in performance by reducing the signal delay in a SOP module may be beneficial to improving the performance of the overall IC design.

Referring now to FIG. 1, an integrated circuit 100 includes a number of functional blocks 101-105,110. Each of these functional blocks may have its logical circuitry synthesized or generated by an ECAD tool in one embodiment of the invention. Each of these functional blocks 101-105,110 may be present in data paths of an integrated circuit. Functional block 101 is a multiplier to multiply input vectors a and b to obtain the result a*b. Functional block 102 is a constant multiplier to multiply the vector a by a constant K to obtain the result a*K. Functional block 103 is a squarer to multiply the vector a with itself to obtain the result a*a or $a^2$. Functional block 104 is a multiplier-accumulator (MAC) to multiply vectors a and b together and add it to the vector c to obtain the result a*b+c. Functional block 105 is a chain-of-adders or adder tree to add the vectors a and b together with the vectors c and d to obtain the result a+b+c+d. Functional block 110 is any functional block that may include a sum of products (SOP) logical operation to evaluate any expression of the general form of a*b+c*d+e where one or more product terms (e.g., a*b) are summed together with another vector or product term. Functional blocks 101-105 generally include logical circuitry to perform a sum-of-products operation that may be referred to as a sum of products module. In the modern VLSI chips with large data path widths, the design of functional blocks with a sum-of-products operation in a data path is very challenging.

Figure 2:
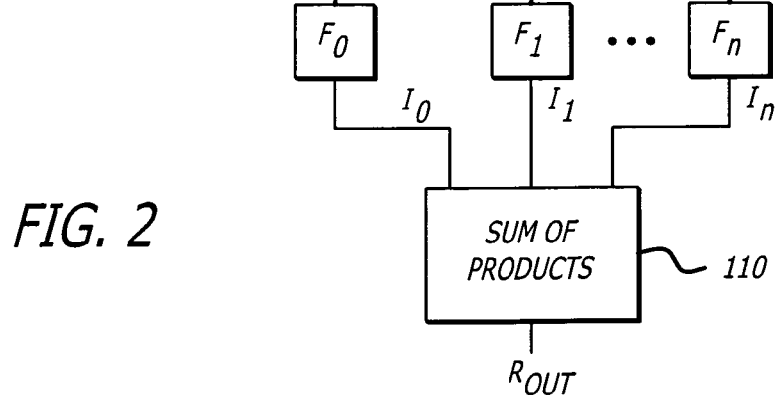
FIG. 2 is a diagram illustrating functional blocks in an integrated circuit design that provide differing arrival times to a sum of products functional block.

Referring now to FIG. 2, a sum of products functional block 110 may receive various input signals $I_0$ through $I_n$ from function blocks $F_0$ 201A through $F_n$ 201n. Each of the input signals $I_0$ through $I_n$ may include one or more bits or signals that are coupled between the function blocks $F_0$ 201A through $F_n$ 201n and the sum of products block 110.

Each of the delay or arrival times of the input signals $I_0$-$I_n$ to the sum of products functional block 110 can be different.

Moreover, each of the individual bits or signals of each input signal $I_n$ from a function block $F_n$ 201n may have a different delay time to the sum of products functional block 110. In either case, input signals and their individual bit signals may arrive at different times to the sum-of-products functional block 110. In the logic synthesis of the sum of products functional block 110, a logic synthesizer may consider the difference in timing of input signals and other logic delays.

Figure 3:
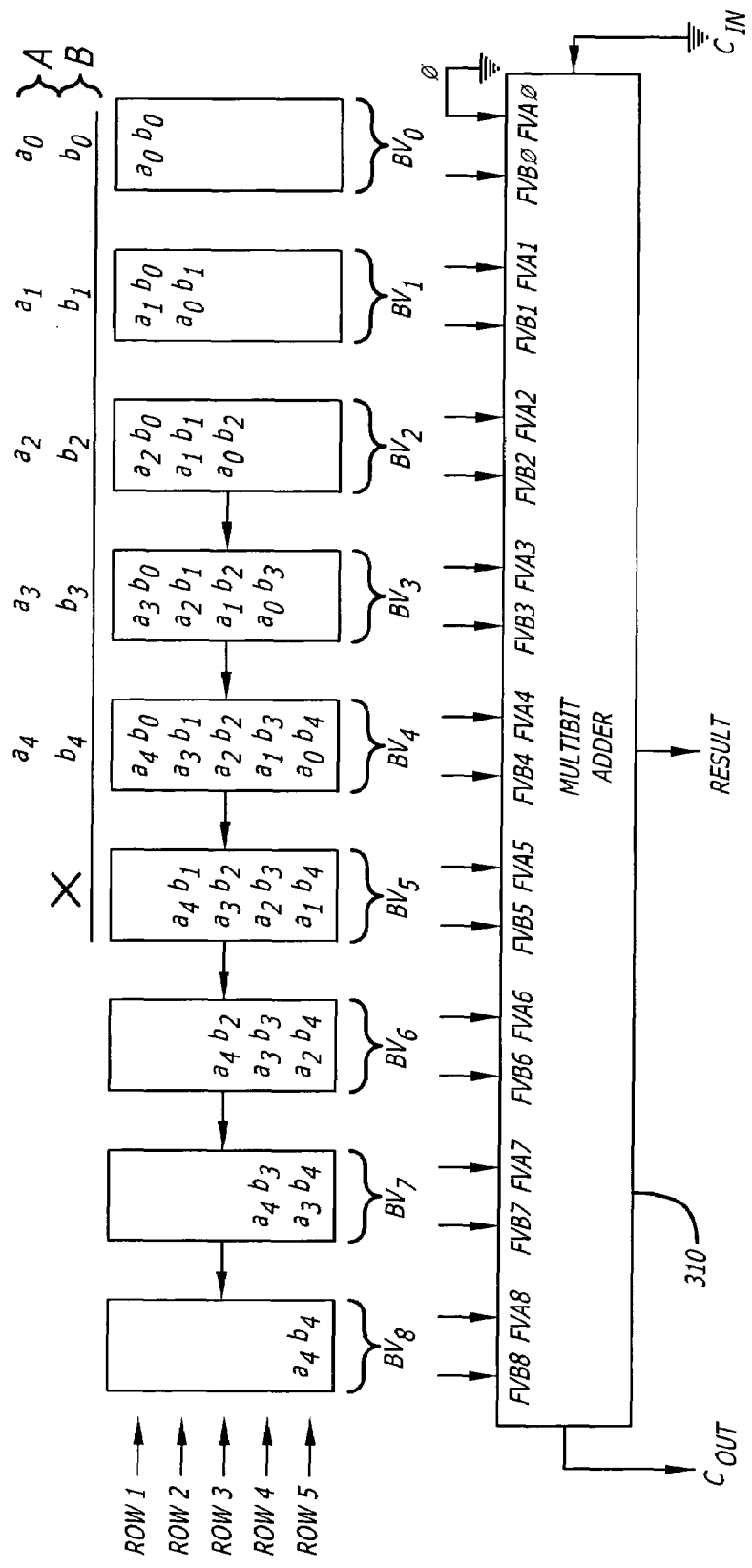
FIG. 3 is a diagram illustrating multiplication of two five bit numbers/vectors together, the formation of partial products, bit-vectors, and the two final vectors that are added together in a multibit adder to obtain a resultant product.

Referring now to FIG. 3, multiplication of a multi bit number or signal or vector A with a multi bit number or signal or vector B is illustrated as an exemplary function of a sum-of-products functional block. In the multiplication of binary numbers, the mathematics may be similarly performed to traditional long handed multiplication. In Boolean algebra of binary bits, multiplication of one bit by another bit is a 2-input AND operation that can be performed by a 2-input AND logic gate.

For any Sum-of-Product (SOP), we may define a bit-vector for the $i^{th}$ bit as a set including the partial-product bits belonging to the $i^{th}$ bit. Let us consider an example of a 2*2 multiplier, which multiplies $\{a_1, a_0\}$ by $\{b_1, b_0\}$. In that case, the bit-vectors are $BV_0=\{a_0 \cap b_0\}$; $BV_1=\{a_1 \cap b_0, a_0 \cap b_1\}$; and $BV_2=\{a_1 \cap b_1\}$ where $\cap$ represents a Boolean AND function. Bit-vectors can be similarly defined for any Sum-of-Products. For example, in an m-bit by n-bit multiplier there are (m+n)−1 bit-vectors that can be defined.

In the exemplary multiplication illustrated in FIG. 3, vector A includes five bits $a_0$ through $a_4$ and vector B includes five bits $b_0$ through $b_4$. The 5-bit by 5-bit multiplication has (5+5)−1 or nine bit-vectors that can be defined. The multiplication of vector A and vector B forms five rows and nine columns. In Row 1, bit $b_0$ of vector B is multiplied with each bit of vector A. In Row 2, shifted one bit to the left, bit $b_1$ of vector B is multiplied with each bit of vector A. In row 3, shifted two bits to the left, bit $b_2$ of vector B is multiplied with each bit of vector A. In Row 4, shifted three bits to the left, bit $b_3$ of vector B is multiplied with each bit of vector A.

In Row 5, shifted four bits to the left, bit $b_4$ of vector B is multiplied with each bit of vector A.

Each of the columns generated by the bit multiplication of the bits of the vectors A and B and bit shifting in the rows is referred to as a bit-vector (BV). For the example multiplication illustrated in FIG. 3, nine bit-vectors $BV_0$ through $BV_8$ are formed. In the first column, the multiplication of bit $a_0$ and Bit $b_0$ together forms one partial product as the bit-vector $BV_0$. In the second column, the multiplication of bit $a_1$ with bit $b_0$ and the multiplication of bit $a_0$ and $b_1$ together forms two partial products of the bit-vector $BV_1$. In the third column, the multiplication of bit $a_2$ with bit $b_0$, the multiplication of bit $a_1$ with bit $b_1$, and the multiplication of bit $a_0$ and bit $b_2$ together forms three partial products of the bit-vector $BV_2$ as illustrated. The other bit-vectors $BV_4$-$BV_8$ include the partial products as shown in FIG. 3 for the exemplary multiplication.

To synthesize the logic for the exemplary multiplication or sum-of-products function, it is desirable to reduce the number of adders to one multi bit adder to reduce the delay in generating a final result. This is important, because the final adder adds a significant delay in the data path of an integrated circuit chip. In order to reduce the number of adders used in the mathematical operation, a partial product reduction is performed that reduces the terms of each bit-vector down to two numbers that can be added by the multi bit adder 310. The two numbers are referred to as final vector A (FVA) and the final vector B (FVB). In the case of the multiplication illustrated in FIG. 3, final vector A has nine bits FVA0-FVA8 and final vector B has nine bits FVB0-FVB8 coupled into the multi bit adder 310.

Because bit-vectors BV1 and BV0 generate no more than two values and carry bits are of no concern, no further reduction of partial products is necessary for bit-vector $BV_0$ and bit-vector $BV_1$. However, bit-vector $BV_2$ includes three terms that may be reduced down to two numbers that can be added together by the one multi bit adder 310. As the bit-vector $BV_0$ has only one partial product term or value that may be coupled to bit FVB0, the final vector A bit FVA0 may be set to a logic zero value (such as by being coupled to ground) as the other term of the multi bit adder 310 for bit zero.

In reducing a bit-vector down to two sum values that may be added together by one multi bit adder, carry output bits may result that are coupled to the next highest bit-vector. For example, bit-vector $BV_2$ has three terms that are reduced down to two bits or signals and a carry bit. The carry bit of bit-vector $BV_2$ is coupled into bit-vector $BV_3$. As another example, consider bit-vector $BV_4$ that includes five partial product terms or elements. Bit-vector $BV_4$ also receives carry bits or signals from bit-vector $BV_3$ that need to be summed together with the partial product terms to generate the final resultant output. Additionally, multiple intermediate sum bits may be generated in reducing a bit-vector down to two values. Bit-vector $BV_4$, for example, receives at least one carry bit from bit-vector $BV_3$ and includes five partial product terms. In reducing the elements or terms of bit-vector $BV_4$, a number of intermediate sum bits are generated that require further summation together in order to finally reduce the bit-vector down to two values for summation by an adder. Thus, each bit-vector may be considered to further include elements of intermediate sum bits of previously reduced partial product terms and carry bits from a prior bit-vector.

Depending upon the expected delays or arrival times of the partial product terms (which is also a function of the input signals), the carry signals from the prior bit-vector, and the intermediate sums of prior reduction within a bit-vector, the reduction of the elements within a given bit-vector may vary.

Referring now momentarily to FIG. 9, a method of the general function and logic synthesis of a sum of products functional block is illustrated. Initially at block 901, the partial products are generated as part of bit-vectors. Then as part of bit-vectors, the partial products are all reduced down to two multi bit numbers or vectors at block 902. Then the two multi bit numbers or vectors are added together at block 903 in order to get the final result of the computation involving the sum of products.

Assuming that we want to multiply a multiple bit signal/number/vector "A" having n-bits together with a multiple bit signal/number/vector "B" having m-bits with their individual bits represented as follows:

Vector A: a[n−1] a[n−2] . . . a[2] a[1] a[0]

Vector B: b[m−1] . . . b[2] b[1] b[0]

In this case, we generate m rows of partial products and each row would have n-elements so that there were m+n−1 bit-vectors. As further discussed herein, every bit of a partial product is generated by a 2-input AND function or 2-input AND gate. Thus, "AND(a[i], b[j])" used herein indicates a two-input AND operation between bits a[i] and b[j].

In this example, the partial products in row 1 would be:
AND(a[n−1],b[0]) AND(a[n−2],b[0]) . . . AND(a[2],b[0]) AND(a[1],b[0]) AND(a[0],b[0])

The partial products in row 2 would be (shifted left by 1-bit):
AND(a[n−1],b[1]) AND(a[n−2],b[1]) . . . AND(a[2],b[1]) AND(a[1],b[1]) AND(a[0],b[1])

The partial products in row 3 would be (shifted left by 2-bits):
AND(a[n−1],b[2]) AND(a[n−2],b[2]) . . . AND(a[2],b[2]) AND(a[1],b[2]) AND(a[0],b[2])

The partial products in row 4 would be (shifted left by 3-bits):
AND(a[n−1], b[3]) AND(a[n−2],b[3]) . . . AND(a[2],b[3]) AND(a[1],b[3]) AND(a[0],b[3])

The partial products in other rows are similarly formed with additional bit shifts left wherein the last row m would be (shifted left by m−1 bits):

AND(a[n−1],b[m−1]) AND(a[n−2],b[m−1]) . . . AND(a[2],b[m−1]) AND(a[1],b[m−1]) AND(a[0],b[m−1])

The foregoing describes how m-rows of partial products get generated to form m+n−1 bit-vectors. In total (m*n) number of 2-input AND gates are used in the generation of all the partial products for multiplication of multi-bit vectors/numbers/signals A and B together.

With the partial products generated, partial product reduction for each bit-vector may be made to two final multi-bit vectors/numbers/signals so that a final addition can be made to produce the final output of the multiplier. While the partial product reduction may be used for differing number of bits of vectors/numbers/signals of A and B, a partial product reduction of signed or unsigned vectors/numbers/signals may also be made in accordance with the embodiments of the invention.

After generating the bit-vectors, most of the bit-vectors contain more than two elements. In the phase of reduction of bit-vectors, we reduce each bit-vector to a maximum of two elements. In SOPs, most of the delay is spent in the phase of reduction of bit-vectors (which are also sometimes referred to as partial-products in the existing literature).

In the reduction process, the smallest input granularity one can achieve is two terms or input signals which can be reduced down to a sum and carry bit by a half adder.

Figure 4A:
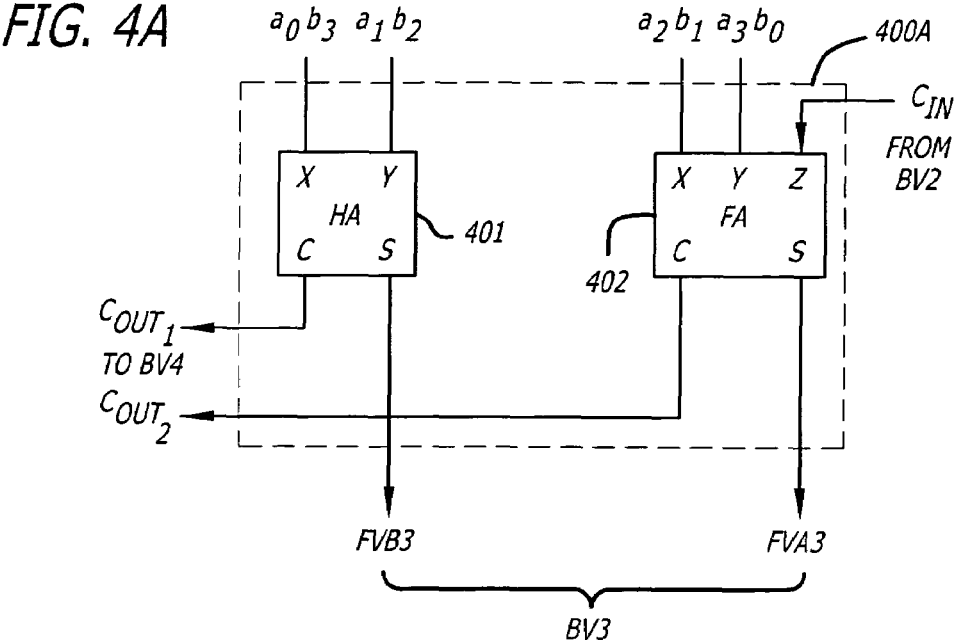
FIG. 4A is a logic diagram illustrating one exemplary logic synthesis of the reduction of a fourth bit-vector BV3 associated with the multiplication illustrated in FIG. 3.
Figure 4B:
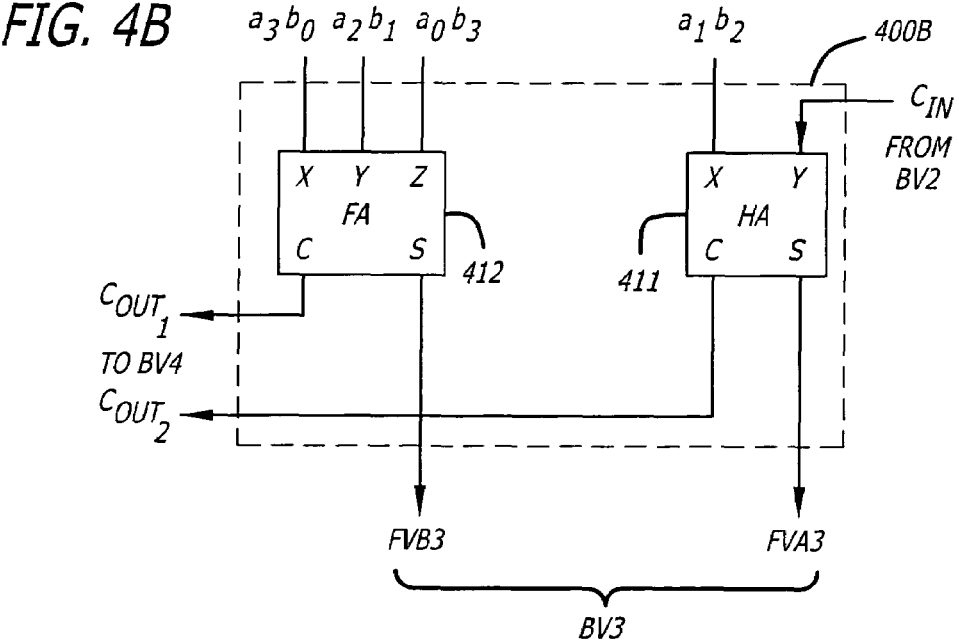
FIG. 4B is a logic diagram illustrating another exemplary logic synthesis of the reduction of the fourth bit-vector BV3 associated with the multiplication illustrated in FIG. 3.

As an example for the synthesis of reducing partial products down to two numbers, reference is now made to FIGS. 4A and 4B of different synthesized logic that may be used to reduce bit-vector $BV_3$ of the exemplary multiplication illustrated in FIG. 3. In FIG. 4A, a half adder (HA) 401 is used to reduce the partial products $a_0b_3$ and $a_1b_2$ down to a sum bit and a carry bit. A full adder (FA) 402 is utilized to reduce the carry in bit from bit-vector $BV_2$ along with the partial products $a_2b_1$ and $a_3b_0$ down to a sum bit and a carry bit. The sum bit from the half adder 401 is coupled into the multi bit adder 310 as the final vector bit FVB3. The sum output of the full adder 402 is coupled into the multi bit adder 310 as the final vector bit FVA3. The carry out from the full adder 402 is coupled into the bit-vector BV4 as a carry in signal. The carry out of the half adder 401 is coupled into bit-vector BV4 as an element thereof.

In analyzing the arrival times of the carry in from bit-vector BV2 and the partial products $a_0b_0$, $a_2b_1$, $a_1b_2$, and $a_0b_3$, it may be determined that the carry in bit and the partial product $a_1b_2$ arrives much earlier than the rest. In which case a half adder may be utilized to generate a sum and carry out sooner rather than later.

Referring now to FIG. 4B, a half adder 411 is utilized to reduce the elements of the carry in bit from bit-vector $BV_2$ and the partial product $a_1b_2$ down to a sum and carry output respectively as the final vector bit FVA3 and a first carry to bit-vector BV4. The remaining partial product terms $a_0b_3$, $a_2b_1$, and $a_3b_0$ may be coupled into the full adder 412 to generate the sum output bit for the final vector bit FVB3. From FIGS. 4A-4B, it can be seen that the logic synthesis of circuitry for the reduction of partial products in a bit-vector may vary as a result of the various signal timing (delay, arrival time) of the elements within a given bit-vector.

Figure 5:
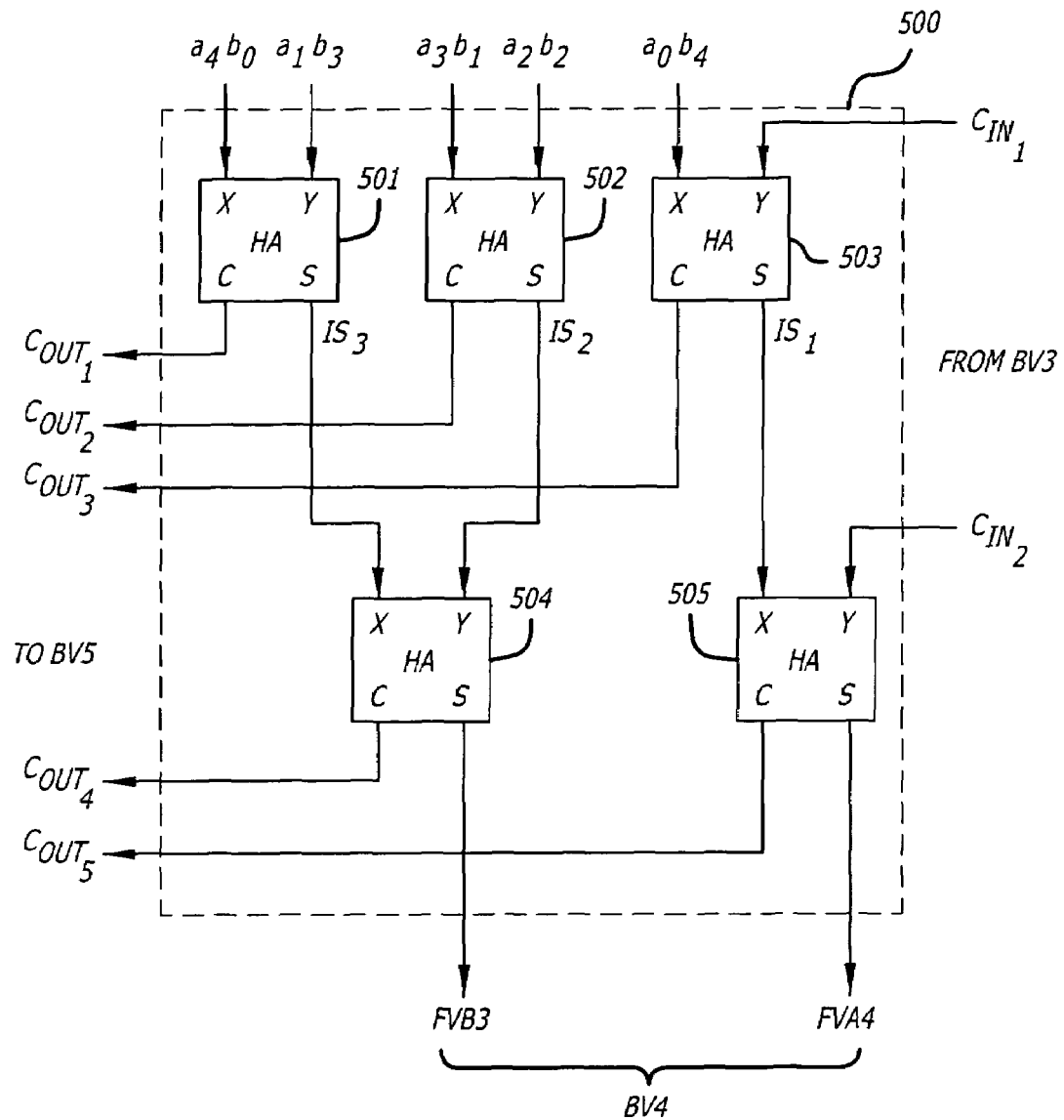
FIG. 5 is a logic diagram illustrating an exemplary logic synthesis of the reduction of a fifth bit-vector BV4 associated with the multiplication illustrated in FIG. 3.

Referring now to FIG. 5, an exemplary logic synthesis for the reduction of elements of bit-vector $BV_4$ is illustrated. Logic circuitry 500 includes half adders 501-505 coupled together as shown and illustrated. Half adder 503 receives the carry input from bit-vector $BV_3$ along with the partial product $a_0b_4$ as elements. These elements are reduced into an intermediate sum $IS_1$ and a carry output 3 for the bit-vector $BV_5$. Half adder 505 receives an intermediate sum bit IS1 and the carry bit $CIN_2$ from the bit-vector $BV_3$ to generate the final vector bit FVA4 and a carry out bit 5 for the bit-vector $BV_5$. Half adder 502 receives the partial products $a_2b_2$ and $a_3b_1$ to be reduced to an intermediate sum bit $IS_2$ and a carryout 2 bit for the bit-vector $BV_5$. Half adder 501 receives partial product terms $a_1b_3$ and $a_4b_0$ to reduce down to the intermediate sum bit $IS_3$ and the carryout 1 bit for the bit-vector BV5. Half adder 504 receives the intermediate sum bits $IS_2$ and $IS_3$ to reduce them down to the final vector bit FVB4 and the carryout bit for the bit-vector $BV_5$.

FIG. 5 illustrates that in the signal analysis not only are partial product terms analyzed but also the carry in bits and the intermediate sum bits to make a determination of whether half adders or full adders are to be utilized in the circuit synthesis.

In some SOPs (e.g., multiplier, constant multiplier or squarer), there are some techniques to bypass the reduction of certain bit-vectors. For other SOPs, every bit-vector needs to go through a reduction step. For all bit-vectors requiring reduction to two values, a timing-driven approach to logic synthesis is performed by using a combination of full adders as (3:2) counters and half adders as (2:2) counters. That is, the reduction of the partial product terms may be accomplished by using a combination of half adders and/or full adders in response to the expected arrival times signal delays. There are various combinational circuits that may be used as half adders and full adders.

A half adder (HA) is a combinational circuit that forms the arithmetic sum of two input bits. The half adder has two inputs, two significant bit X and Y; and two outputs, a sum output (S) and a carry output (C).

Figure 6A:
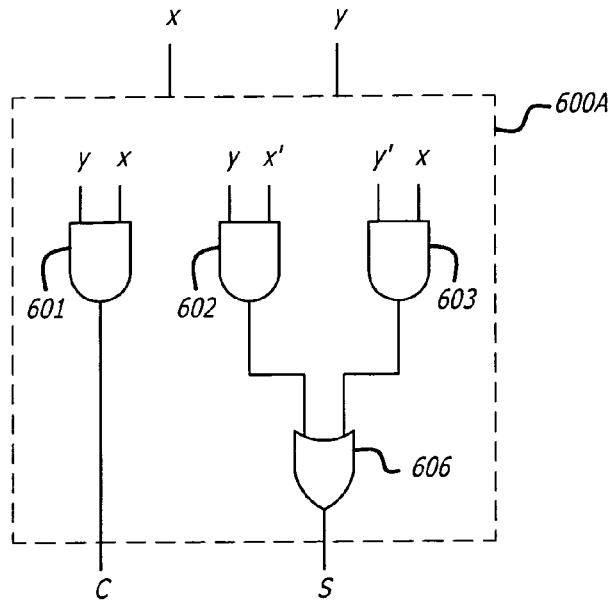
FIG. 6A is a logic diagram illustrating one exemplary combinational logic schematic of a half adder (HA).
Figure 6B:
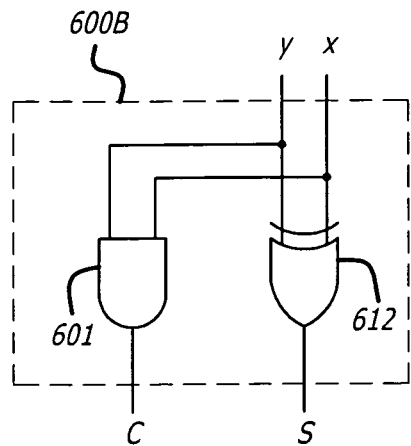
FIG. 6B is a logic diagram illustrating another exemplary combinational logic schematic of a half adder (HA).

Referring now to FIGS. 6A-6B, a half adder may be implemented by combinational logic in a variety of ways. FIGS. 6A and 6B, illustrate different combinational logic that may be used to form a half adder to reduce two input signals X and Y into a sum bit S and a carry bit C.

In FIG. 6A, the half adder 600A includes AND gates 602-603 and OR gate 606 coupled together as shown to generate the sum bit output S in response to the x and y input signals and their compliment input signals x' and y', respectively. The half adder 600A further includes an AND gate 601 coupled as shown to generate the carry bit output C in response to the x and y input signals. In this case the combination logic implements the equations:

S=xy'+x'y (which is a sum of products equation) and

C=xy, where x' is the inverted signal of x and y' is the inverted signal of y. This is also a special case of sum of products equation.

The inverters or NOT gates that generate x' and y' respectively from x and y are not shown in FIG. 6A.

Referring now to FIG. 6B, another half adder combinational logic circuit is illustrated for generating sum and carry bits from the two input signals x and y. The half adder ANDgate 601 is also utilized in ANDing the x and y input signals to generate the carry bit output C. An exclusive-or (XOR) gate 612 coupled to the x and y input signals is used to generate the sum bit output S for the half adder 600B.

A full adder (FA) is a combinational circuit that forms the arithmetic sum of three input bits. The full adder has three inputs, three significant bit X, Y and Z (or a carry input)); and two outputs, a sum output (S) and a carry output (C).

Figure 7A:
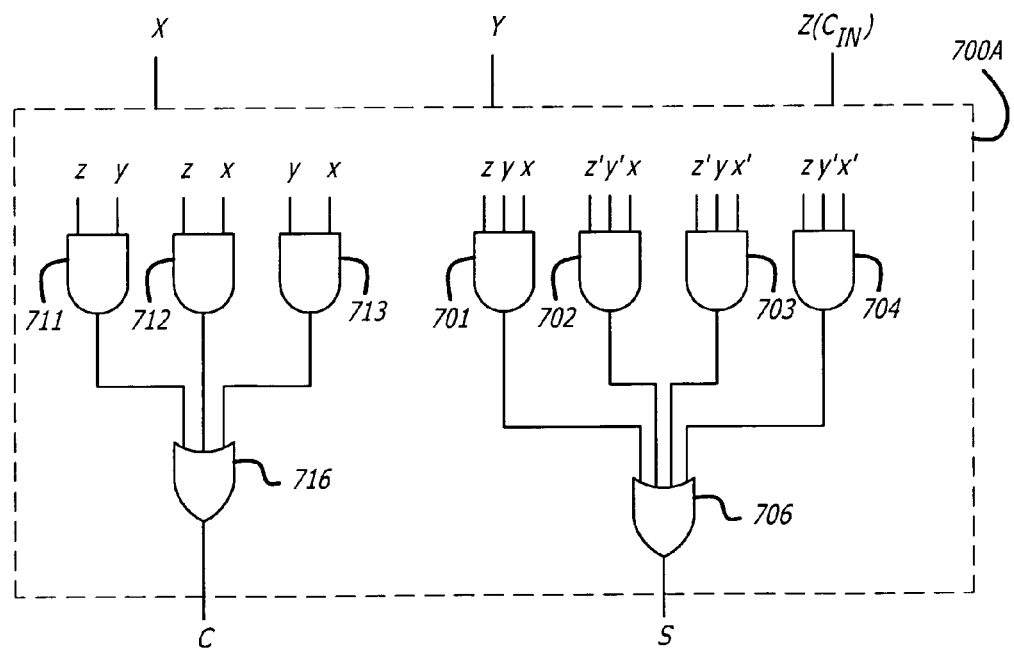
FIG. 7A is a logic diagram illustrating one exemplary combinational logic schematic of a full adder (FA).
Figure 7B:
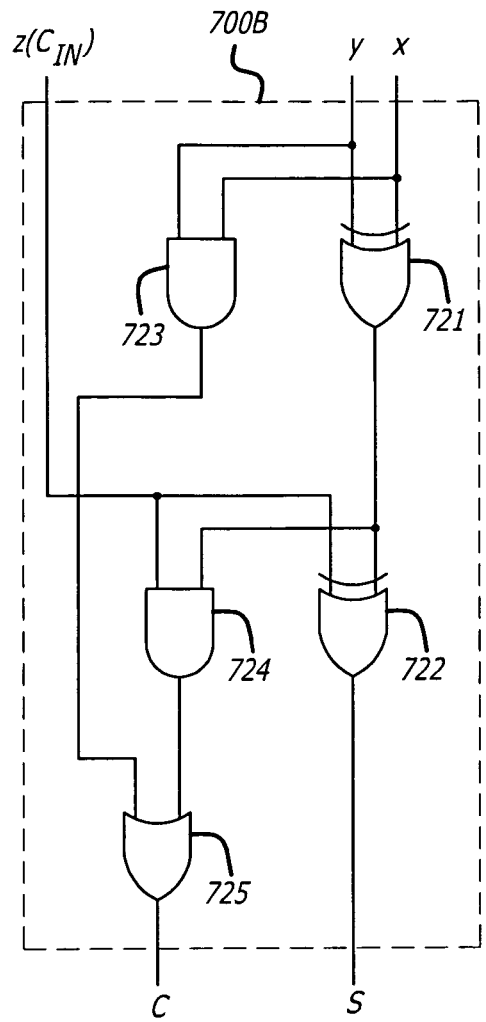
FIG. 7B is a logic diagram illustrating another exemplary combinational logic schematic of a full adder (FA).
Figure 8:
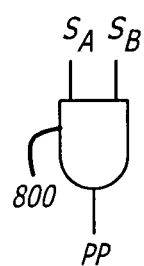
FIG. 8 is a logic diagram illustrating an exemplary combinational logic schematic for generation of a partial product of two bits.

Referring now to FIGS. 7A-7B, a full adder may be implemented by combinational logic in a variety of ways. One exemplary implementation of a full adder 700A is illustrated in FIG. 7A. The full adder 700A includes AND gates 701-704 and OR gate 706 coupled together as shown to generate the sum output S. The full adder 700A further includes AND gates 711-713 and OR gate 716 coupled together as shown to generate the carry bit output C. In this case the combination logic implements the equations S=x'y'z+x' yz'+xy'z'+xyz and C=xy+xz+yz, where x', y', z' are the inverted signals of x, y, z respectively. Each of the equations for S and C in this case are sum-of-product equations. The inverters or NOT-gates used to generate x', y' and z' from x, y and z, respectively, are not shown in FIG. 7A.

Referring now to FIG. 7B, a full adder 700B is illustrated The full adder 700B combines two half adder circuits 600B together with an OR-gate 725 to generate the sum S and carry output C of the full adder. The full adder 700B includes AND gates 723-724 and XOR gates 721-722 coupled together as shown to generate the sum output S. The full adder 700B further includes AND gates 723-724 and OR gate 725 coupled together as shown to generate the carry bit output C.

In comparing the half adder 600B illustrated in FIG. 6B with the full adder 700B illustrated in FIG. 7B, the sum output S includes an additional exclusive or-gate delay due to the exclusive or-gates generation of the sum output bit of the full adder 700B. Thus, the delay of an exclusive or-gate may be used to determine whether it is preferable to synthesize using a full adder 700B in reducing partial product terms down to the two multi bit numbers.

Referring now back to FIG. 9, at block 902 the partial products are reduced down to two final multi bit numbers or vectors FVA and FVB. In response to expected signal timing, determining whether a full adder or half adder is utilized in the logic synthesis for the reduction of the bit-vectors and partial products is now described and illustrated.

Figure 10A:
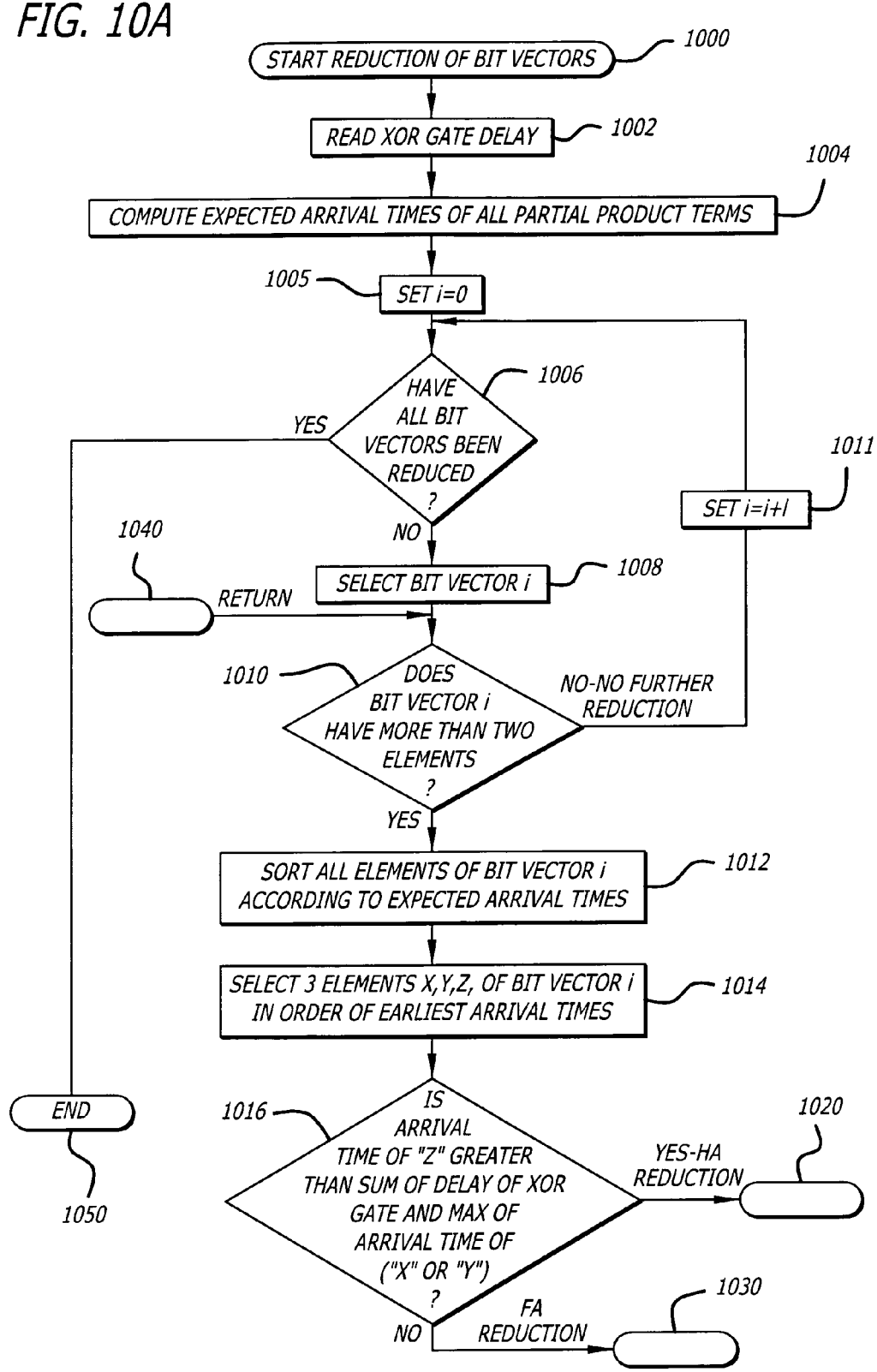
FIGS. 10A-10C are flow charts of logic synthesis methods for functional blocks including a sum of products arithmetic operation.
Figure 10B:
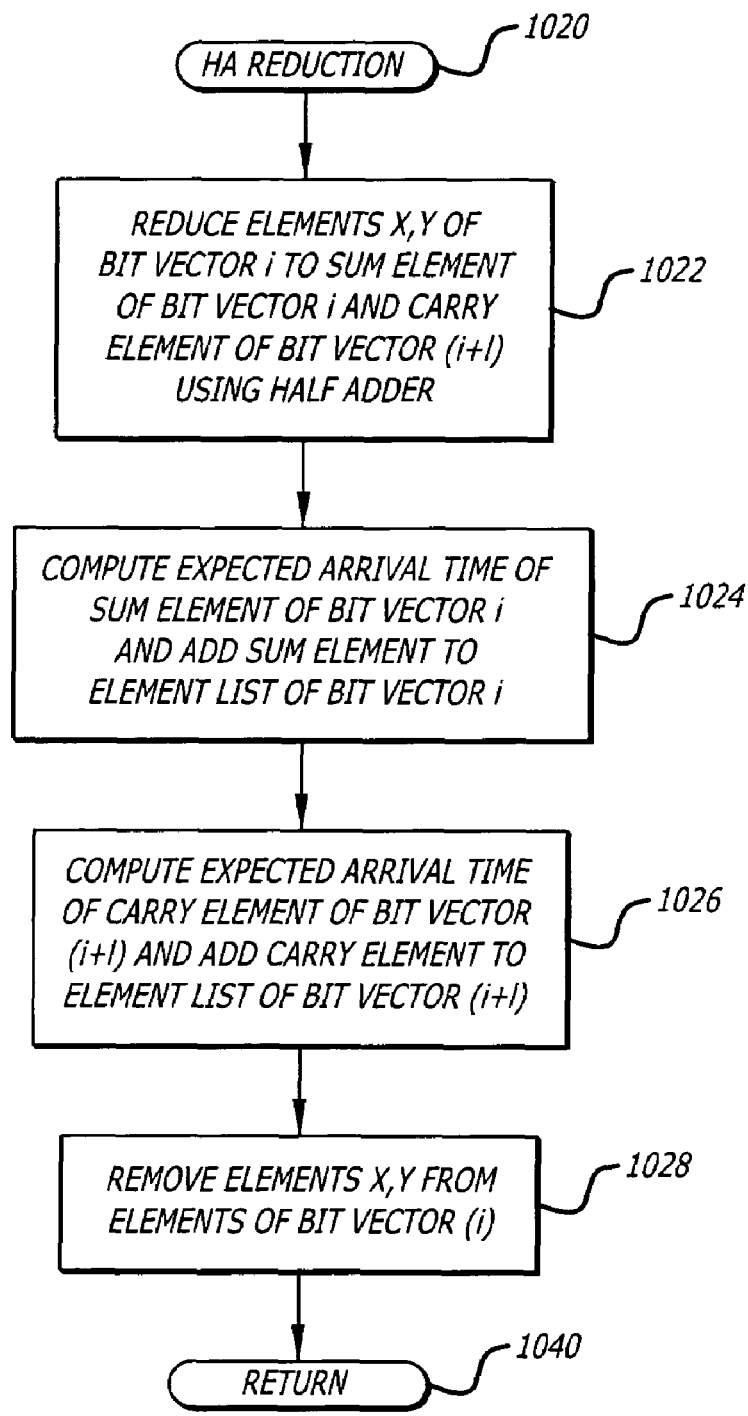
Figure 10C:
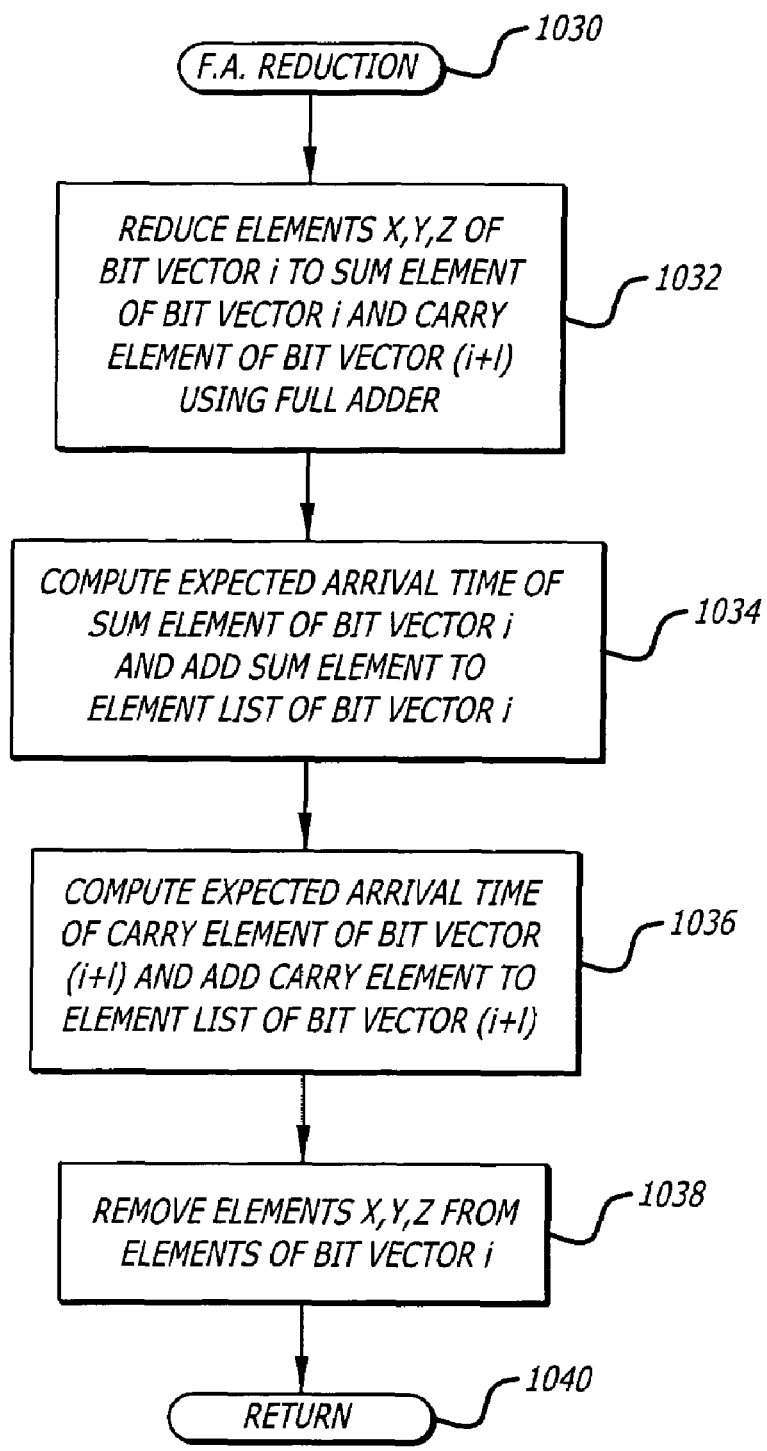

FIGS. 10A-10C are flow charts illustrating methods of logic synthesis for functional blocks that include a sum of products arithmetic operation. More specifically, FIGS. 10A-10C illustrate methods of logic synthesis for the reduction of bit-vectors and partial products.

After the logic synthesizer detects that a sum of products functional block is present and has synthesized the partial product generation, the logic synthesis for the reduction of bit vectors synthesis is called at block 1000. At block 1002, the delay of an exclusive-or (XOR) gate or other delay (e.g., a delay for another type of gate) is read from the technology file for the standard cell library. In one embodiment of the invention, the gate delay of the exclusive-OR gate is utilized to compare whether or not a half adder or a full adder should be used in the synthesis of the logic for the reduction of bit-vectors. Other types of gate delays may be utilized instead if it is felt that the exclusive or-gate delay is too great in comparison with other gate delays.

At block 1004, the expected arrival times of all the partial product terms is computed as a function of each bit of the multi bit numbers or vectors that are being mathematically operated on.

At block 1005, a variable "i" is initialized by setting it to zero.

At decision block 1006, a determination is made if all bit vectors have been reduced for the given mathematical operation. If so, then the circuit synthesis ends at block 1050. If not, at block 1008 the next bit-vector BVi is selected as the current bit-vector for synthesis.

At decision block 1010, a determination is made if the current bit-vector BVi has more than two elements. If not, only two elements or one element are present and no further reduction is needed as these one or two numbers are coupled directly to the adder 310, the variable "i" is incremented by one at block 1011, and the process returns back to the decision block 1006. If the bit vector does have more than two elements, then a determination may be made as to whether a half adder or a full adder reduction is appropriate for the two or three elements of the given bit-vector and the process continues on to block 1012.

At block 1012, all the elements of bit-vector BVi are sorted according to their expected arrival times. As discussed previously the elements that may be present within a bit vector are the partial product terms, intermediate sums of the bit vector, and the carry bits from a prior bit vector.

At block 1014, out of the sorted list of elements of bit-vector BVi, three elements x, y and z of the bit-vector BVi are selected in order of there earliest arrival times. Out of these three elements, x arrives first; then y arrives; and finally z arrives.

At decision block 1016, the three elements x, y and z of the bit vector are analyzed to determine if the arrival time of z is greater than the sum of the delay of the exclusive-or gate and the maximum arrival time of either element x or element y.

If the arrival time of z is greater than the sum of the delay of exclusive-or gate and the maximum arrival time of either element x or element y, then half adder reduction is appropriate on the x and y elements and the process jumps to block 1020 illustrated in FIG. 10B. The process of using a half adder to reduce elements of a bit-vector begins at block 1020.

On the other hand if the expected arrival time of z is less than the sum of the delay of exclusive-or gate and the maximum arrival time of either element x or element y, then a full adder reduction is appropriate on the elements x, y and z and the process jumps to block 1030 illustrated in FIG. 10C. The process of using a full adder to reduce elements of a bit-vector begins at block 1030.

Referring now to FIG. 10B, the method of half adder reduction of elements of the bit-vector begins at block 1020 with a jump to block 1022.

At block 1022, elements x and y of the bit-vector BVi are reduced down to a sum element of the bit-vector BVi and a carry element for the bit-vector BV(i+1) using a half adder.

Then at block 1024, the expected arrival time of the sum element of bit-vector BVi is determined and the sum element is added to the element list of bit-vector BVi for further consideration of reduction.

Next at block 1026, the expected arrival time of the carry element of bit-vector BV(i+1) generated by the half adder is computed and the carry element is added to the list of elements of bit-vector BV(i+1) for consideration of reduction at a later stage.

Continuing the process at block 1028, the elements x and y of the bit-vector BVi are removed from the reduction list for bit-vector BVi. This is because they have now been reduced and no further consideration of these elements is needed. The process then goes to block 1040.

At block 1040, the process returns to decision block 1010 illustrated in FIG. 10A to determine if any further reduction of elements of the bit-vector BVi is necessary.

Referring now to FIG. 10C, the method of full adder reduction of elements begins at block 1030 with a jump to block 1032.

At block 1032, elements x, y and z of the bit-vector BVi are reduced down to a sum element of bit-vector BVi and a carry element for the bit-vector BV(i+1) using a full adder.

Then at block 1034, the expected arrival time of the sum element of bit-vector BVi is computed and the sum element is then added to the element list of bit-vector BVi for further consideration of reduction.

Next at block 1036, the expected arrival time of the carry element of bit-vector BV(i+1) generated by the full adder is computed and the carry element is added to the list of elements of bit-vector BV(i+1) for consideration of reduction at a later stage.

Continuing to block 1038, the elements x, y and z that have been considered are removed from the elements on the reduction list for bit-vector BVi. This is because they have now been reduced and no further consideration of these elements is needed. The process then goes to block 1040.

At block 1040, the process returns to decision block 1010 illustrated in FIG. 10A to determine if additional reduction of elements of the bit-vector Bvi is needed.

The code for the reduction algorithm of bit-vectors may be written as follows below, assuming that 2n−1 bit-vectors are to be reduced.

—Begin Bit Vector Reduction Algorithm—

Delay(EX-OR)=delay of the fastest 2-input EX-OR gate from the technology library //Reduce the (2n−1) BitVectors for i=0 to (2n−2)
begin
   Compute arrival times for all signals
     (notation: Arr(X)=arrival time of signal X)
   Sort all the signals in BitVector$_i$ according to the arrival
     time (in ascending order)
   while BitVector$_i$ has more than 2 elements
     begin
       Select the three signals (X, Y, Z) with earliest arrival
         times
       If (Max(Arr(X), Arr(Y))+Delay(EX-OR)<Arr(Z))
       then
       begin
         Perform (2:2) reduction of signals X and Y
         by using half-adders
         Compute the arrival time of the resulting
         sum-bit and add that to the sorted list of
         elements of BitVector$_i$
         Compute the arrival time of the resulting
         carry-bit and add that to the list of elements
         of BitVector$_{(i+1)}$
         Remove signals X and Y from the list of elements of
          BitVector$_i$
       end
Else //If (Max(Arr(X),Arr(Y))+Delay(EX-OR)≧Arr(Z))
   begin
     Perform (3:2) reduction of signals X, Y and Z
     by using full-adders
     Compute the arrival time of the resulting
     sum-bit and add that to the sorted list of
     elements of BitVector$_i$
     Compute the arrival time of the resulting
     carry-bit and add that to the list of elements
     of BitVector$_{(i+1)}$
     Remove signals X, Y and Z from the list of
     elements of BitVector$_i$
     end //of if-then-else
   end //(of while loop)

end //(of for loop)

return all (2n−1) BitVectors; each BitVector consists of less than or equal to 2 elements —End Bit Vector Reduction Algorithm—

The bit-vector reduction algorithm uses the timing profile of each input signal and the signals generated there-from to determine whether a half adder is better to use in the reduction of partial products or other elements of a bit-vector in a sum-of-products block. The different significant bits in the input signals may also arrive at different times. The bit-vector reduction algorithm can work with a variety of timing constraints.

Generally, the bit-vector reduction algorithm looks for opportunities to use (2:2) counters over (3:2) counters in response to the arrival times of terms in a bit-vector. The following are the equations for the Sum-bit of the two counters (the symbol ⊕ represents an exclusive-or operation):

$$\text{Sum}=(x \oplus y) \oplus z \text{ (for (3:2) counters)}$$

$$\text{Sum}=(x \oplus y) \text{ (for (2:2) counters)}$$

From these two sum-bit equations it can be seen that if the earliest arriving two signals (x and y) arrive at least one 2-input XOR gate-delay before the third signal (signal z), then we can improve the delay of the reduction tree by using a (2:2) counter. The usage of that counter effectively reduces one element from the bit-vector, and can lead to a faster reduction tree.

In addition, the method may also take an aspect of a technology library into consideration. The fastest 2-input XOR cell may be identified from the technology library and used in the reduction algorithm. The use of the technology library may ensure the proper functioning of the logic across different technology domains (e.g., 0.18μ, 0.13μ, 0.09μ, 0.065μ etc.).

During partial-product reduction 902, (2:2) counters are intelligently used with (3:2) counters in the logical synthesis of sum-of-products functional blocks. Use of (2:2) counters by the logic synthesizer module helps to more quickly reduce the partial product signals to achieve a final resultant output.

The logic in the partial product reduction tree does not need to wait to find three signals with similar arrival times. The embodiments of the invention search for two terms with similar arrival times and a third term with a delayed arrival time greater than a gate delay, so that a (2:2) counter may be used to reduce the two terms with similar arrival times.

Thus, the foregoing described timing-driven algorithm used to efficiently synthesize logic to reduce partial products in response to different timing constraints/situations, results in a faster SOP (Sum-of-Product).

Figure 11:
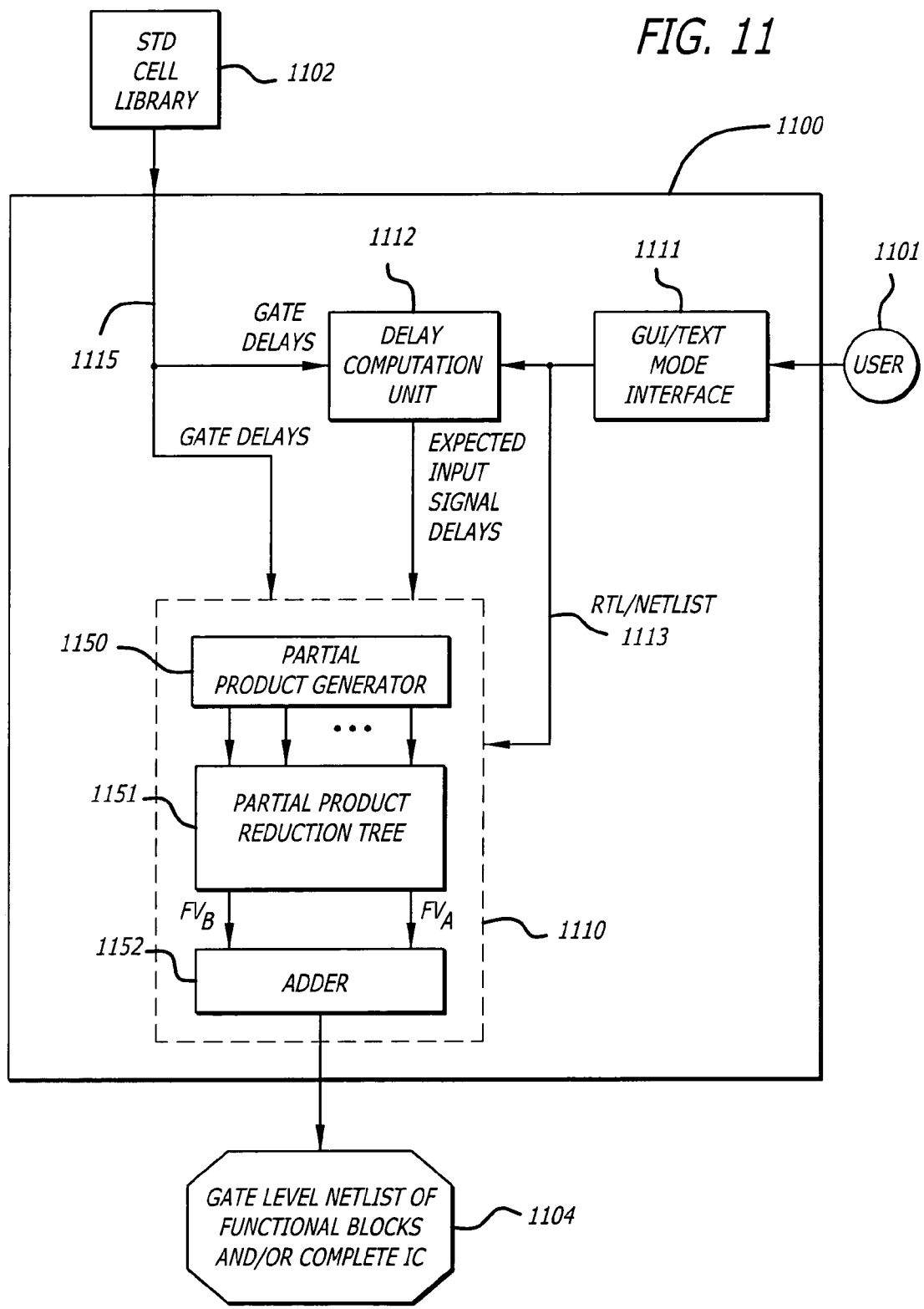
FIG. 11 is a block diagram of software modules of embodiments of the invention used to perform logic synthesis of functional blocks including a sum of products arithmetic operation.

Referring now to FIG. 11, an exemplary block diagram is illustrated of software modules of an electronic design automation (EDA) tool 1100 used to perform logic synthesis of functional blocks that include a sum of products arithmetic operation. The synthesis EDA tool 1100 receives user inputs from a user 1101 and a standard cell library 1102 in order to generate a gate level net list 1104 of functional blocks and/or the complete integrated circuit. The EDA tool 1100 includes a graphical user interface (GUI) or a text mode interface 1111 for receiving inputs from the user 1101 in the form of a register transfer level (RTL) description (for example, Verilog, VHDL, System-Verilog, System-C, etc.) or netlist of the sum of products functional block, as well as other functional blocks of the integrated circuit.

The input (RTL/Netlist) 1113 description of the functional blocks/integrated circuit is coupled into a sum of products synthesizer 1110 and a delay computation unit 1112. The delay computation unit 1112 computes the expected input signal delays as well as the delays for all the peripheral product terms that are to be generated for the sop functional block. The delay computation unit 1112 further receives the gate delay information 1115 from the technical library of the standard cell library 1102 to compute the expected delays and/or arrival times of signals. The expected gate delay information for an exclusive-or gate or another type of gate is provided to the SOP synthesizer 1110 in order to make a determination of whether a half adder or a full adder should be used to respectively reduce two or three terms in the partial product reduction tree 1151.

A sum of products synthesizer 1110 includes algorithms to generate the logic for the partial product generator 1150, the logic for the partial product reduction tree 1151, and the logic for the multi bit adder 1152 to add the two final vectors FVA, FVB together in order to perform the mathematical operation of the sum of products functional block. The logic for the multibit adder 1152 is well known. Exemplary algorithms for use in generating the logic of the partial product generator and the partial product reduction tree were previously described.

Referring now to FIG. 12, a computing system 1200 is illustrated that may be used to perform some or all of the processes in accordance with a number of embodiments of the invention. In one embodiment of the invention, the computing system 1200 includes a processor 1210, a memory 1220, a removable media drive 1230, and a hard disk drive 1240. In one embodiment, the processor 1210 executes instructions residing on a machine-readable medium, such as the hard disk drive 1240, a removable medium 1201 (e.g., an optical medium (compact disk (CD), digital video disk (DVD), etc.), a magnetic medium (magnetic disk, a magnetic tape, etc.), or a combination of both. The instructions may be loaded from the machine-readable medium into the memory 1220, which may include Random Access Memory (RAM), dynamic RAM (DRAM), etc. The processor 1210 may retrieve the instructions from the memory 1220 and execute the instructions to perform the operations described above.

Note that any or all of the components and the associated hardware illustrated in FIG. 12 may be used in various embodiments of the system 1200. However, it should be appreciated that other configurations of the system 1200 may include more or less devices than those shown in FIG. 12.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments of the invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below.

In addition, the embodiments of the invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Generally, the embodiments of the invention employ a timing-driven algorithm that mixes (2:2) counters with (3:2) counters in the synthesis of any general form of sum-of-product logic. Using half adders and full adders to synthesize logic in response to signal timing can improve the performance of an SOP functional block to speed the generation of the resultant output.

The embodiments of the invention are thus described. While embodiments of the invention have been particularly described, they should not be construed as limited by such embodiments, but rather construed according to the claims that follow below.

While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

When implemented in software, the elements of the embodiments of the invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a read only memory (ROM), a flash memory, an erasable programmable read only memory (EPROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

What is claimed is:

1. An integrated circuit (IC) design tool for synthesizing logic for a sum-of-products functional block in response to a description of a sum-of-products function, the IC design tool comprising:
   instructions stored in a storage device that when executed by a processor provide one or more software modules to synthesize a gate-level netlist of a sum of products functional block including
      a partial products generator to multiply bits of a first vector and a second vector together to generate partial product terms,
      a partial product reduction tree coupled to the partial products generator, the partial products reduction tree to reduce bit-vectors of the sum-of-products function down to a pair of final vectors, the synthesis of the partial product reduction tree responsive to a comparison gate delay and expected arrival times of the partial product terms in each bit vector, and
      an adder coupled to the partial product reduction tree to receive the pair of final vectors, the adder to add the pair of final vectors together to generate a final result for the sum-of-products functional block.

2. The integrated circuit (IC) design tool of claim 1, wherein
   the bits of the first vector and the second vector are multiplied together by logically ANDing the bits together to generate the partial product terms.

3. The integrated circuit (IC) design tool of claim 1, further comprising:
   instructions stored in the storage device that when executed by a processor provide
   a delay computation unit to receive gate delays of a cell library and compute the expected arrival times of signals including partial product terms of each bit-vector of the sum-of-products functional block in response to the register-transfer-level (RTL) netlist.

4. The integrated circuit (IC) design tool of claim 3, wherein
   the delay computation unit further to compute expected arrival times of signals including any carry bits and intermediate sums for each bit-vector of the sum-of-products functional block, and
   the synthesis of the partial product reduction tree is further responsive to the expected arrival times of the carry bits and the intermediate sums in each bit-vector.

5. The integrated circuit (IC) design tool of claim 1, further comprising:
   instructions stored in the storage device that when executed by a processor provide
   a user interface software module to generate an RTL netlist including at least one sum-of-products functional block.

6. The integrated circuit (IC) design tool of claim 1, wherein
   the synthesis of the partial product reduction tree selects between using a half adder and a full adder to reduce a bit-vector in response to the comparison gate delay and the expected arrival times of the partial product terms.

7. The integrated circuit (IC) design tool of claim 6, wherein
the comparison gate delay is the gate delay of an exclusive-or gate.

8. A machine-readable product to synthesize logic for a sum-of-products functional block in response to a description of a sum-of-products function, the machine-readable product comprising:
   a machine readable storage device having stored therein
      machine readable program code to generate partial product terms of a sum-of-products functional block in an integrated circuit (IC) design and form elements of bit-vectors;
      machine readable program code to reduce the elements of each bit vector to two signals of a pair of final vectors in response to expected arrival times of the elements of the bit vectors; and
      machine readable program code to form an adder to add the pair of final vectors together to generate a final result of the sum-of-products functional block.

9. The machine-readable product of claim 8, wherein,
the elements of a bit vector include one or more of partial product terms, intermediate sums, and carry bits.

10. The machine-readable product of claim 8, wherein,
the machine readable storage device further has stored therein
   machine readable program code to compute the expected arrival times of the elements of the bit vectors including all partial product terms.

11. The machine-readable product of claim 8, wherein,
the machine readable storage device further has stored therein
   machine readable program code to select three elements X, Y, Z of a bit vector in order of earliest arrival times; and
   machine readable program code to determine if the arrival time of element Z is greater than a sum of the delay of an exclusive-or gate and the maximum of the arrival time of element X and element Y, and
      if so then reduce elements X and Y using a half adder to a sum bit of the current bit vector and a carry bit for the next significant bit vector,
      else reduce elements X, Y, and Z using a full adder to a sum bit of the current bit vector and a carry bit for the next significant bit vector.

12. The machine-readable product of claim 10, wherein,
if the arrival time of element Z is greater than the sum of the delay of an exclusive-or gate and the maximum of the arrival time of element X and element Y,
the machine readable storage device further has stored therein
   machine readable program code to compute the expected arrival time of the sum bit and add it to the list of elements of the bit vector;
   machine readable program code to compute the expected arrival time of the carry bit and add it to the list of elements of the next significant bit vector; and
   machine readable program code to remove X, Y from the list of elements of the bit vector.

13. The machine-readable product of claim 10, wherein,
if the arrival time of element Z is less than or equal to the sum of the delay of an exclusive-or gate and the maximum of the arrival time of element X and element Y,
the machine readable storage device further has stored therein
   machine readable program code to compute the expected arrival time of the sum bit and add it to the list of elements of the bit vector;
   machine readable program code to compute the expected arrival time of the carry bit and add it to the list of elements of the next significant bit vector; and
   machine readable program code to remove X, Y, Z from the list of elements of the bit vector.

14. The machine-readable product of claim 8, wherein,
the machine readable storage device is a magnetic storage device.

15. The machine-readable product of claim 8, wherein,
the machine readable storage device is a semiconductor storage device.

16. A method of designing an integrated circuit including logic for a sum-of-products functional block in response to a description of a sum-of-products function, the method comprising:
   with a processor
      computing the expected arrival times of all partial product terms formed by a first input vector and a second input vector;
      selecting a bit vector for reduction;
      determining if the bit vector has more than two elements for reduction and if so then
         sorting all elements of the bit vector according to expected arrival times,
         selecting in order of earliest expected arrival times three elements X, Y, Z of the bit vector, and
         determining if the latest expected arrival time of the three selected elements is greater than a sum of a gate delay and a maximum arrival time of the remaining two elements of the three selected elements, and
            if so then reducing the remaining two elements using a half adder to a sum bit of the current bit vector and a carry bit for the next significant bit vector,
            else reducing the three selected elements using a full adder to a sum bit of the current bit vector and a carry bit for the next significant bit vector.

17. The method of claim 16, further comprising:
computing the expected arrival time of the sum bit and adding it to the list of elements of the bit vector;
computing the expected arrival time of the carry bit and adding it to the list of elements of the next significant bit vector; and
removing the reduced elements of the three selected elements from the list of elements of the bit vector.

18. The method of claim 17, wherein
the latest expected arrival time of the three selected elements is greater than the sum of the gate delay and the maximum arrival time of the remaining two elements of the three selected elements, and
the remaining two elements of the three selected elements are reduced and removed from the list of elements of the bit vector.

19. The method of claim 17, wherein
the latest expected arrival time of the three selected elements is not greater than the sum of the gate delay and the maximum arrival time of the remaining two elements of the three selected elements, and
all three selected elements are reduced and removed from the list of elements of the bit vector.

20. The method of claim 16, wherein
the gate delay is that of an exclusive-or gate.

21. The method of claim 16, further comprising:
prior to computing the expected arrival times of all partial product terms,
generating the partial product terms by logically ANDing bits of the first input vector with bits of the second input vector.

22. The method of claim 21, further comprising:
forming a multibit adder to add the respective bits of each reduced bit vector to generate a result of the sum-of-products functional block.

* * * * *